United States Patent [19]
Marelin et al.

[11] Patent Number: 6,014,792
[45] Date of Patent: Jan. 18, 2000

[54] BAND CLAMP INCLUDING BAND AND SEPARATELY ATTACHED BUCKLE

[75] Inventors: Miklos Marelin, Aurora; Mark Mossbrucker, Littleton; Hans R. Hinnen, Wheat Ridge; John E. Whalen, Jr., Evergreen, all of Colo.

[73] Assignee: Band-It-Idex, Inc., Denver, Colo.

[21] Appl. No.: 09/176,049

[22] Filed: Oct. 20, 1998

[51] Int. Cl.[7] .............................. B65D 63/00; F16L 33/00
[52] U.S. Cl. .......................... 24/20 R; 24/23 B; 248/74.1
[58] Field of Search ................... 24/20 R, 23 R, 24/23 W, 20 EE, 23 EE, 20 TT, 17 A, 21, 23 B, 483, 484, 703.1, 270; 285/252, 253; 248/74.1

[56] References Cited

U.S. PATENT DOCUMENTS

| | | |
|---|---|---|
| 1,000,083 | 8/1911 | Flora . |
| 1,849,784 | 3/1932 | Birch et al. ................... 24/21 |
| 2,192,979 | 3/1940 | McAneny, Jr. ................ 24/23 |
| 2,870,503 | 1/1959 | McAneny ..................... 24/23 |
| 2,882,934 | 4/1959 | Gerrard .................... 140/93.2 |
| 3,015,865 | 1/1962 | Rapuzzi ....................... 24/21 |
| 3,067,640 | 12/1962 | Lodholm ..................... 81/9.3 |
| 3,261,062 | 7/1966 | Scarborough, Jr. ........... 24/19 |
| 3,660,869 | 5/1972 | Caveney et al. ........... 24/16 PB |
| 3,833,969 | 9/1974 | Hollingsworth et al. ...... 24/23 W |
| 4,015,311 | 4/1977 | Curtis ................... 24/23 W X |
| 4,272,870 | 6/1981 | McCormick ............... 24/16 PB |
| 4,473,925 | 10/1984 | Jansen ..................... 24/23 W |
| 4,570,340 | 2/1986 | Shaw ......................... 30/123 |
| 4,607,867 | 8/1986 | Jansen ...................... 285/242 |
| 4,646,591 | 3/1987 | Jansen ....................... 81/9.3 |
| 4,747,433 | 5/1988 | Dixon ....................... 140/150 |
| 4,765,032 | 8/1988 | Fortsch ..................... 24/23 R |
| 4,887,334 | 12/1989 | Jansen et al. ............... 24/23 R |
| 4,896,402 | 1/1990 | Jansen et al. ............... 24/20 R |
| 4,928,738 | 5/1990 | Marelin et al. ............ 140/93.4 |
| 5,123,456 | 6/1992 | Jansen ..................... 140/93.4 |
| 5,127,446 | 7/1992 | Marelin .................... 140/93.4 |
| 5,303,571 | 4/1994 | Quinn et al. ................. 72/336 |
| 5,322,091 | 6/1994 | Marelin .................... 140/93.4 |
| 5,452,523 | 9/1995 | Jansen ..................... 33/555.4 |
| 5,483,998 | 1/1996 | Marelin et al. ............ 140/93.4 |
| 5,488,760 | 2/1996 | Jansen ..................... 24/16 PB |
| 5,566,726 | 10/1996 | Marelin .................... 140/123.6 |
| 5,644,819 | 7/1997 | Lyons .................... 24/20 EE X |
| 5,647,563 | 7/1997 | Gantner et al. .......... 24/23 EE X |
| 5,743,310 | 4/1998 | Moran .................... 140/123.6 |
| 5,850,674 | 12/1998 | Jansen ......................... 24/21 |

FOREIGN PATENT DOCUMENTS

| | | |
|---|---|---|
| 7408399 | 6/1974 | Netherlands . |
| 594821 | 1/1978 | Switzerland . |
| 663995 | 1/1988 | Switzerland . |

*Primary Examiner*—James R. Brittain
*Assistant Examiner*—Robert J. Sandy
*Attorney, Agent, or Firm*—Sheridan Ross P.C.

[57] ABSTRACT

The non-preformed clamping device of the present invention includes a buckle having an inclined shroud and a raised rear portion and a band having a pair of retention members for holding the buckle in position on the band. The buckle and band can further include matching markers to permit the user to properly orient the buckle on the band.

21 Claims, 8 Drawing Sheets

BAND CLAMP INCLUDING BAND AND SEPARATELY ATTACHED BUCKLE

FIELD OF THE INVENTION

The present invention is directed generally to band clamps and specifically to a band clamp including a band and a separately attached buckle.

BACKGROUND

Band clamps are widely used in a variety of applications. The clamps generally include a band which can be formed into a loop around an object, such as a telephone pole or signage pole, and a separate buckle that receives the opposing ends of the band and locks the ends in a fixed position. An example of a non-preformed band clamp that is useful for outdoor applications is described in U.S. Pat. No. 4,765,032.

In designing a band clamp there are a number of considerations. First, the clamp should have a high tensile strength to resist the substantial tensile force exerted on the clamp during use. Second, the clamp should be inexpensive to manufacture. Band clamps are used in a variety of applications where cost is a significant concern. Third, the buckle should be capable of accommodating one or a multiple of wraps of the band around the object. Finally, the band clamps should be simple in design and easy to use. Often, the user of the clamp is working in a space-restricted area or in a body position where he is unable to use both hands to attach the clamp to the desired object. The user should, if necessary, be capable of using the band clamp with minimal hand operations and tools required. Additionally, the buckle should be designed so that the user can readily determine the proper orientation of the buckle on the band. Improper positioning of the buckle on the band can not only weaken the strength of the band clamp but also increase the amount of time and labor required to engage properly the band with the buckle.

SUMMARY OF THE INVENTION

It is an object of the present invention to provide a band clamp that has a high tensile strength, is inexpensive to manufacture, is capable of accommodating one or a multiple of wraps of the band around the object to be clamped, is simple in design, and is easy to use. Related objectives include providing a band clamp that is designed so as to make evident the proper orientation of the buckle on the band, retains the buckle at the end of the strap without the necessity of bending the strap end under the buckle, and provides smooth, windowless clamping that substantially eliminates leak paths for terrestrial fluids.

The clamping device of the present invention satisfies these and other objectives. The device includes: (a) a band for wrapping around an object and a buckle secured to a first end of the band. The buckle is discrete from (nonintegral with) the band and includes a shroud extending substantially in a first plane and a base extending substantially in a second plane. The first and second planes intersect at an angle to define a slot between the shroud and base for receiving a second end of the band. The device is work hardened to provide a high tensile strength, is cheap to manufacture, simple in design, and easy to use.

The angle between the shroud and base permits the band to pass freely through the buckle and to provide sufficient clearance for one wrap or a multiple of wraps of the band through the buckle. Preferably, the angle is no more than about 35 degrees and more preferably ranges from about 15 to 25 degrees.

The buckle can have a number of features to provide for ease of use. In one configuration, the shroud is positioned above the slot and the slot faces away from the first end of the band (i.e., toward the second end) to permit the shroud to guide the band smoothly through the slot. In another configuration, the shroud includes a crease extending across at least a portion of the shroud that permits the shroud to rotate in response to a force applied to the shroud by the user. This permits the user to lower the profile of the buckle on the object to which the clamping device is attached.

To hold the buckle in position on the band, the band includes a pair of spaced apart retention members (e.g., raised areas on the band) for receiving a portion of the base of the buckle therebetween. When engaged with the base, the retention members are positioned on opposing sides of the buckle. In this configuration, the retention members and shroud are located on opposing sides of the band. Because the buckle will rotate about the portion of the base between the retention members as the band is tightened around the object, the base of the buckle can include a rear section that is elevated above the sides and front of the base for receiving a portion of the band. The elevated rear section lowers the profile of the buckle and reduces the clearance of the band in the slot. Thus feature permits the buckle to accommodate one or more wraps of the band around the object without loss of buckle strength.

To facilitate tightening of the band, one of the retention members is sized to pass through the slot while the other of the retention members is too large to pass through the slot. The latter retention member is located closer to the first end of the band than the former retention member to prevent the buckle from sliding off the first end of the band during engagement by the user. The Preformed retention members permit one-handed operation of the buckle and band by the user, provides labor savings and allows the use of stronger but springier material. The retention members also provide for smooth, windowless clamping that substantially eliminates the leak path for terrestrial fluids.

To provide a buckle having a high strength to resist the force exerted on the buckle by the band when tightened, the buckle is thicker than the band and preferably has a thickness that is at least about 250% and more preferably at least about 340% of the thickness of the band.

The present invention further includes a method for attaching the clamping device to the object. The method includes the steps of:

(a) aligning a marker on the buckle with a marker on the band;

(b) passing a free end (i.e., the second end) and at least a portion of the band through a slot in the buckle;

(c) thereafter forming the band into a loop by passing the free end of the band through the slot (either once for single wrapped clamp or twice for a double wrapped clamp); and (d) thereafter deforming and cutting the band with a tool such that the band will not pass back through the slot in the buckle. The marker on each of the band and buckle permits the user to readily determine the proper orientation of the buckle on the band. This avoids incorrect positioning of the buckle on the band and the inconvenience (and loss of time) resulting from having to remove the buckle from the band and reengage both components in the proper orientation.

As noted, in the thereafter forming step (c) the buckle typically rotates about a portion of the band engaged with the band to decrease the clearance of the band in the slot of the buckle. This permits the use of one or a multiple of wraps by the user without adversely impacting the ability of the buckle to hold the band firmly in position.

DETAILED DESCRIPTION

The clamping device of the present invention includes a band that is looped around the object to be clamped and a buckle that locks the free ends of the band in position around the object. FIGS. 1–10 depict a non-preformed buckle and band 20 and 24 according to an embodiment of the present invention.

Figure 4:
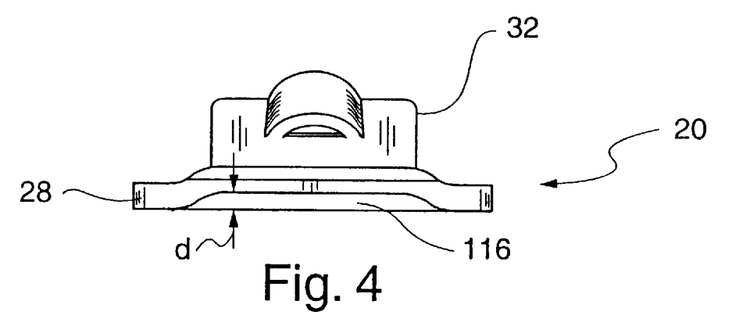
FIG. 4 is a rear view of the buckle.
Figure 5:
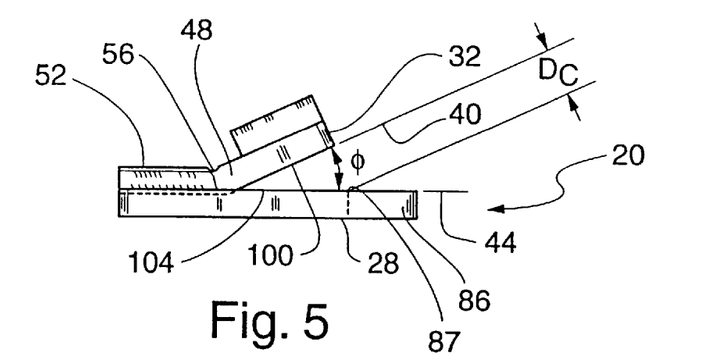
FIG. 5 is a side view of the buckle.
Figure 6:
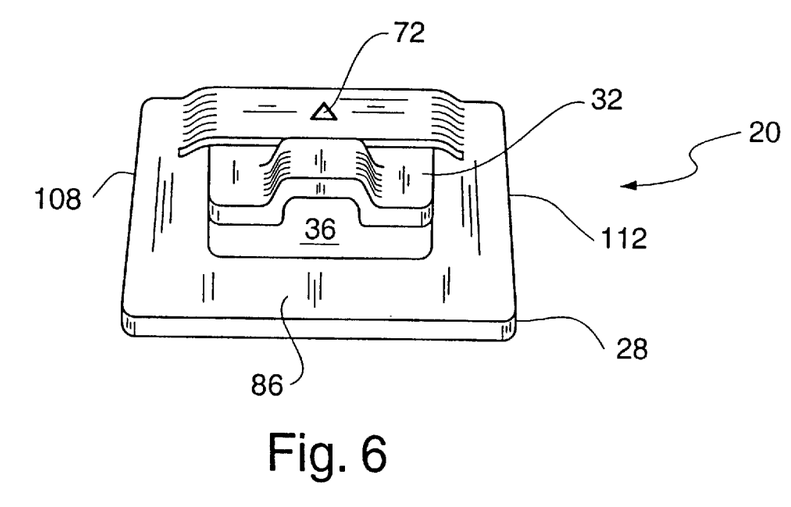
FIG. 6 is a perspective view of the buckle.
Figure 7:
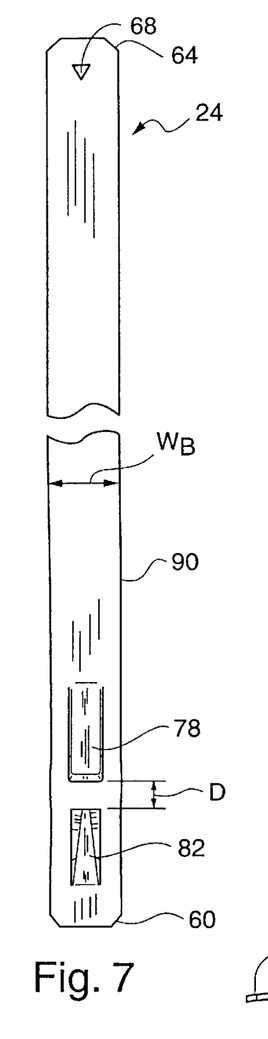
FIG. 7 is a top view of a band according to the embodiment.
Figure 8:
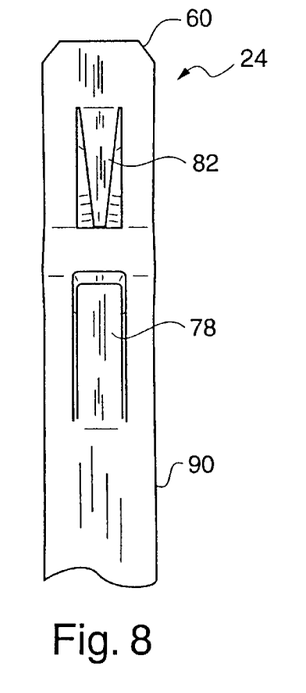
FIG. 8 is a bottom view of the first end of the band.
Figure 9:
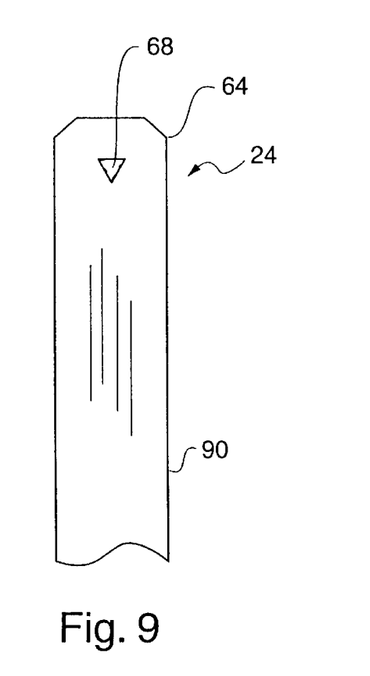
FIG. 9 is a top view of the second end of the band.

Referring to FIGS. 1–6, the buckle 20 includes a base 28 and a shroud 32. The shroud 32 is located above a slot 36 in the base 28 (which passes completely through the base) and extends upwardly at an angle $\theta$ from the base 28. As shown in FIG. 5, the lower surface 100 of the shroud 32 lies substantially in a first plane 40 and the upper surface of the base 28 substantially in a second plane 44, and the first and second planes 40 and 44 intersect at the angle $\theta$. Preferably the angle $\theta$ is at least about 15 degrees and no more than about 35 degrees and more preferably ranges from about 15 to about 25 degrees. The shroud 32 guides the band 24 through the buckle 20 at an angle (which is measured between the band portion passing through the slot and the second plane 44), which is approximately the same as the angle $\theta$, to accommodate one wrap or a multiple of wraps passing through the slot 36. Preferably the angle between the second plane 44 and an upper or lower surface of the portion of the band passing through the slot is at least about 15 degrees but not more than about 35 degrees.

The distance "$D_A$", or the thickness of the band at the front retention member 78, is more than the distance "$D_C$" (FIG. 5) between the shroud 32 and the base 28 and more preferably, at least about 105% of the distance "$D_C$". Conversely, the distance "$D_B$" or the thickness of the band at the rear retention member 82, is less than the distance "$D_C$" and more preferably is no more than about 95% of the distance "$D_C$".

The rear 48 of the shroud 32 is attached to the rear 52 of the base 28. A crease 56 in the rear 48 of the shroud 32 is located at the junction between the rear 48 of the shroud 32 and the rear 52 of the base 28 to permit the shroud 32 to move downward in response to a force (e.g., a hammer blow) exerted on the shroud by the user, thereby lowering the profile of the buckle 20. As will be appreciated, the crease 56 provides a pivot point for plastic deformation of the shroud 32 to occur. The shroud 32 thus rotates downwardly about the junction between the rear of the shroud and the rear 52 of the base in response to the force.

Referring to FIGS. 7–10, the band 24 is an elongated strip 90 having first and second opposing ends 60 and 64. The second end 64 is received in the slot 36 of the buckle 20 to form a loop in the band.

The second end 64 includes a marker 68 that matches a marker 72 on the buckle 20 to permit the user to orient properly the buckle 20 on the band 24. The markers align and point in the same direction when the buckle 20 is properly oriented on the band 24. As will be appreciated, the markers point in opposite directions when the orientation of the buckle 20 is reversed on the band 24.

Figure 1:
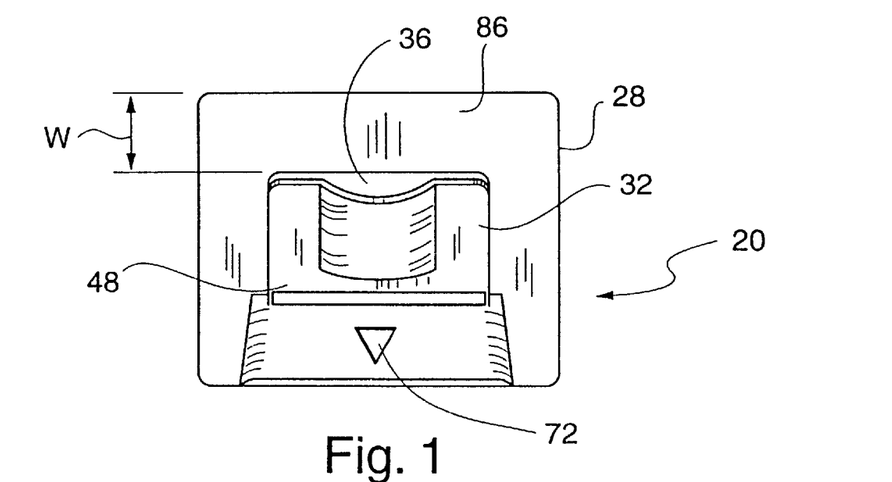
FIG. 1 is a plan view of the buckle according to an embodiment of the present invention.

The first end 60 includes a pair of spaced apart retention members 78 and 82 to hold the buckle 20 in position on the band 24. The distance "D" between the retention members 78 and 82 (FIG. 7) is at least as great as the width "W" of a front 86 of the buckle 20 (FIG. 1). The front 86 of the buckle 20 is received between the spaced apart retention members 78 and 82 to hold the buckle 20 in position on the band 24. As can be seen from FIGS. 10 and 15, the retention member 82 has a vertical face to hold the inside surface of the slot 36 in position and retention member 78 an inclined face to help the base of the buckle to rotate into position between the retention members during tightening of the band around an object.

The height "$H_F$" of the front retention member 78 above the strip 90 is more than the height "$H_R$" of the rear retention member 82 above the strip 90 (FIG. 10) to prevent the first end 60 of the band 24 from passing through the slot 36 in the buckle 20. Accordingly, the distance between the lower surface 100 of the shroud 32 and the adjacent upper surface 104 of the front 86 of the base 28 (FIG. 5) is less than the sum of $H_F$ and the thickness "$T_B$" of the band 90 (FIG. 10) but more than the sum of $H_R$ and the thickness "$T_B$".

The opening of the buckle 20 has a width sufficient to accommodate multiple wraps of the band about the object to be clamped. Referring to FIG. 5, the distance "$D_C$", or the width of the opening between the shroud 32 and the upper edge 87 of the slot 36, is at least about 3.5 times the thickness $T_B$ (FIG. 10) of the band.

Figure 2:
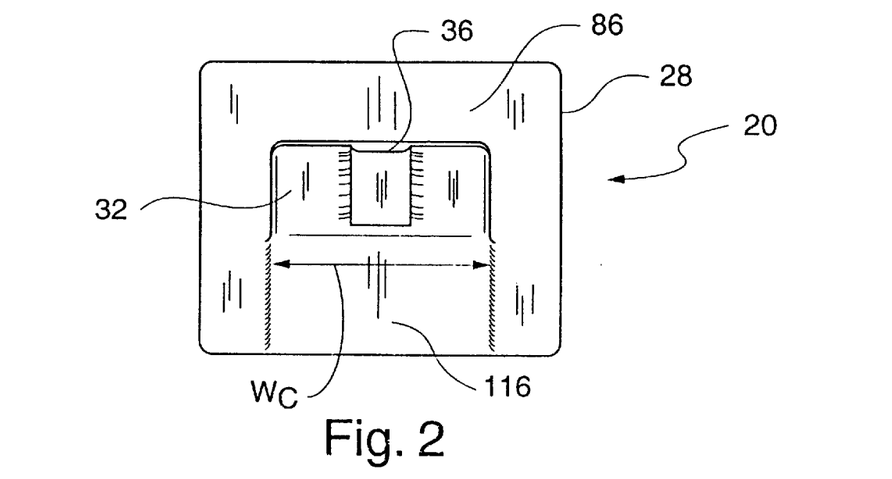
FIG. 2 is a bottom view of the buckle.
Figure 3:
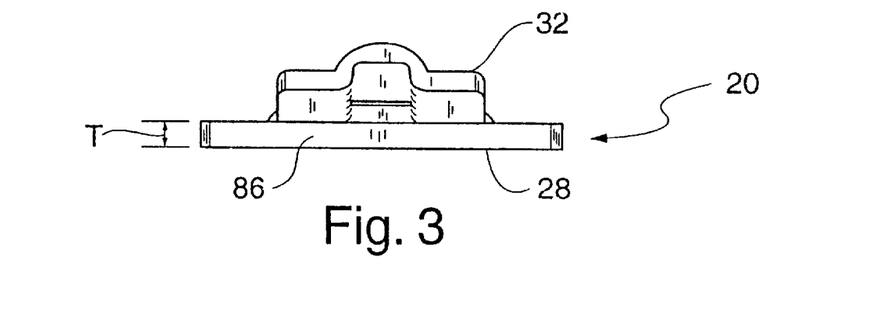
FIG. 3 is a front view of the buckle.
Figure 10:
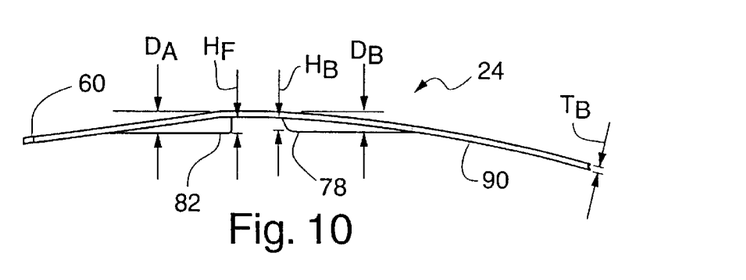
FIG. 10 is a side view of the first end of the band.

The rear 52 of the base 28 of the buckle 20 is elevated above or offset from the remaining portions of the base 28 (i.e., the sides 108 and 112 and front 86 of the base 28) to form a channel 116 (FIGS. 2 and 4). The channel 116 has a width "$W_C$" (FIG. 2) that is at least as much as the width "$W_B$" of the strip 90 (FIG. 7) and a depth "d" (FIG. 4) that is at least about 250% of the band thickness $T_B$ (FIG. 10). The strip 90 is received in the channel 116 during tightening of the band against the object to be clamped. During tightening, the buckle 20 rotates downwardly (FIG. 12) about an edge 144 of the front 86 of the buckle 20 in response to the force exerted on the buckle 20 by the band 24 and an object 120. As the buckle 20 rotates downwardly the clearance between the interior surface 100 of the shroud 32 and the upper surface of the band portion in the slot 36 is decreased. As will be appreciated, more wraps of the strip 90 passing through the slot means less downward rotation of the buckle about the edge 144 because more space in the slot is required to accommodate the wraps; conversely, fewer wraps of the strip passing through the slot means more downward rotation of the buckle about the edge 144 because less space is required. Thus, the angle between the buckle base and the first end of the band is more for three wraps than for two and more for two wraps than for one. In this manner, one or more wraps of the strip 90 can be used with little, if any, clearance remaining after tightening of the clamping device.

To provide sufficient strength to hold the band 20 firmly around the object 120, the thickness "T" of the buckle 20 (FIG. 3) is more than the thickness $T_B$ of the strip 90 (FIG. 10). Preferably, the thickness T of the buckle 20 is at least about 250% and more preferably at least about 340% of the thickness $T_B$.

Figure 16A:
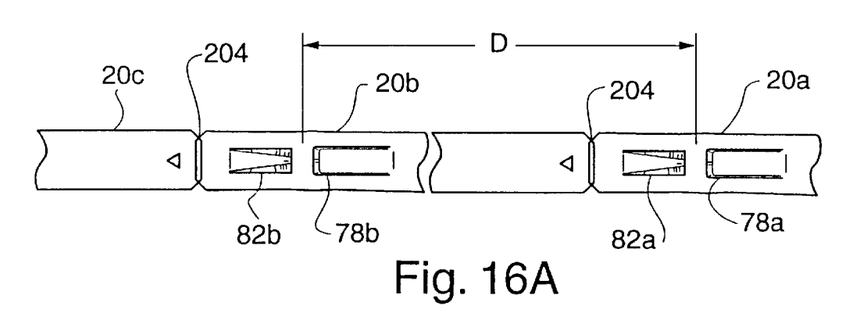
FIGS. 16A–16C are each a view of a portion of a dispensing roll for the bands.
Figure 16B:
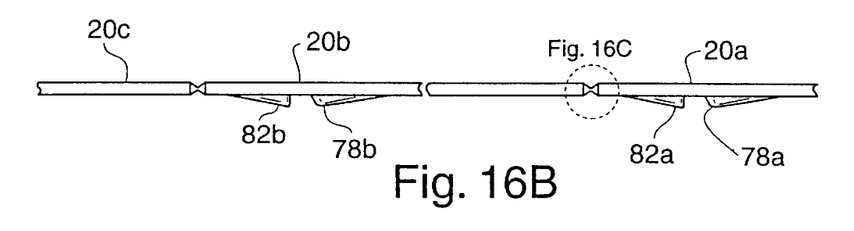
Figure 16C:
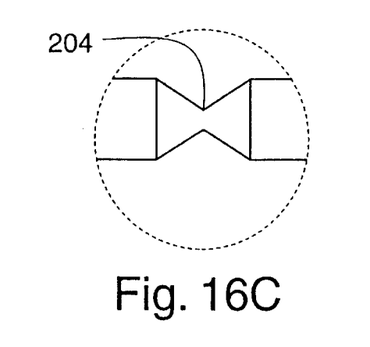

Referring to FIGS. 16A–16C and 17, the packaging for a plurality of the bands 20a–c is depicted. As shown in FIGS. 16A–16C, the bands 20 are interconnected to form a dispensing roll 200. At the point of connection between adjacent bands, upper and lower creases 204 are formed. The creases 204 permit the adjacent bands 20a and b and 20b and c to be easily separated. As will be appreciated, the band material between the creases 204 will work harden and become brittle, thereby permitting adjacent bands to be easily separated by hand at the creases without the use of a cutting tool. The retention members 78 and 82 are repeated among the adjacent bands. The distance "D" between the centerlines of the gap between retention members of adjacent bands determines the length of the band and therefore size of the clamp and, the number of wraps of the band in the clamp. By pre-forming the retention members into a single roll of bands, the manufacture, storage and handling of the bands is simplified and made more convenient. The pre-made roll can be stored and is portable.

Figure 17:
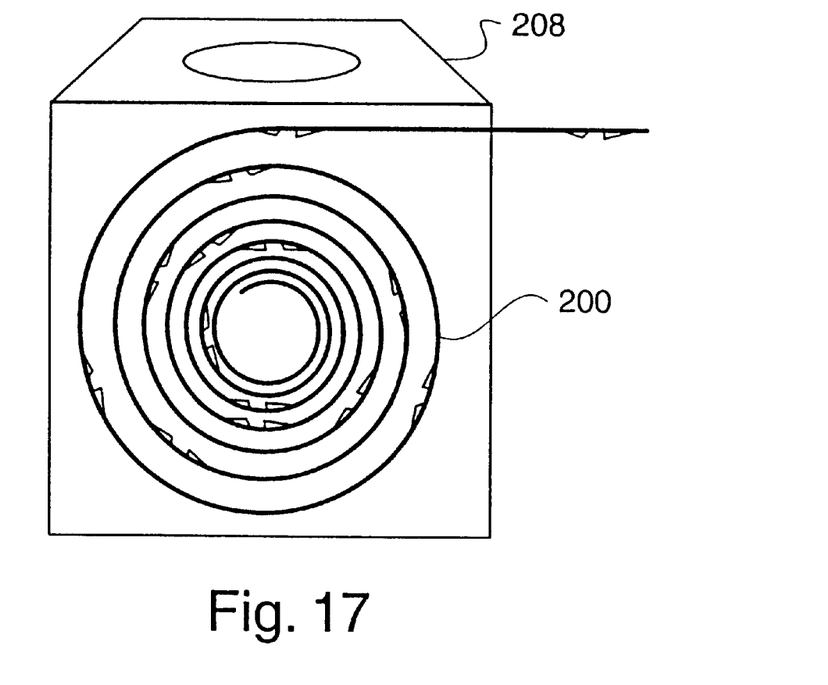
FIG. 17 is another view of the dispensing roll of FIG. 16 in a carrying tote.

The pre-formed roll can be contained in a portable tote 208 as shown in FIG. 17. The one-piece roll 200 is mounted on a rod or left unsupported in the tote 208 to permit the user to unroll the bands without removing the roll from the tote. The free end of the roll 200 extends through a passage in a wall of the tote 208. The tote 208 is preferably made of an inexpensive material, such as plastic.

The operation of the clamping device will now be described with reference to FIGS. 1–17.

Before engaging the clamping device with the object 120, the buckle 20 is engaged with the band 24. To accomplish this, the second end 64 is passed through the slot 36 in the base 28 after the marker 72 on the buckle 20 is aligned with the marker 68 on the second end 64. The buckle 20 is then moved along the strip 90 until the front 86 of the base 28 is positioned between the retention members 78 and 82. In this position, the retention members 78 and 82 are positioned on opposing sides of the base 28, and the slot 36 and shroud 32 face away from the first end 60.

Figure 11:
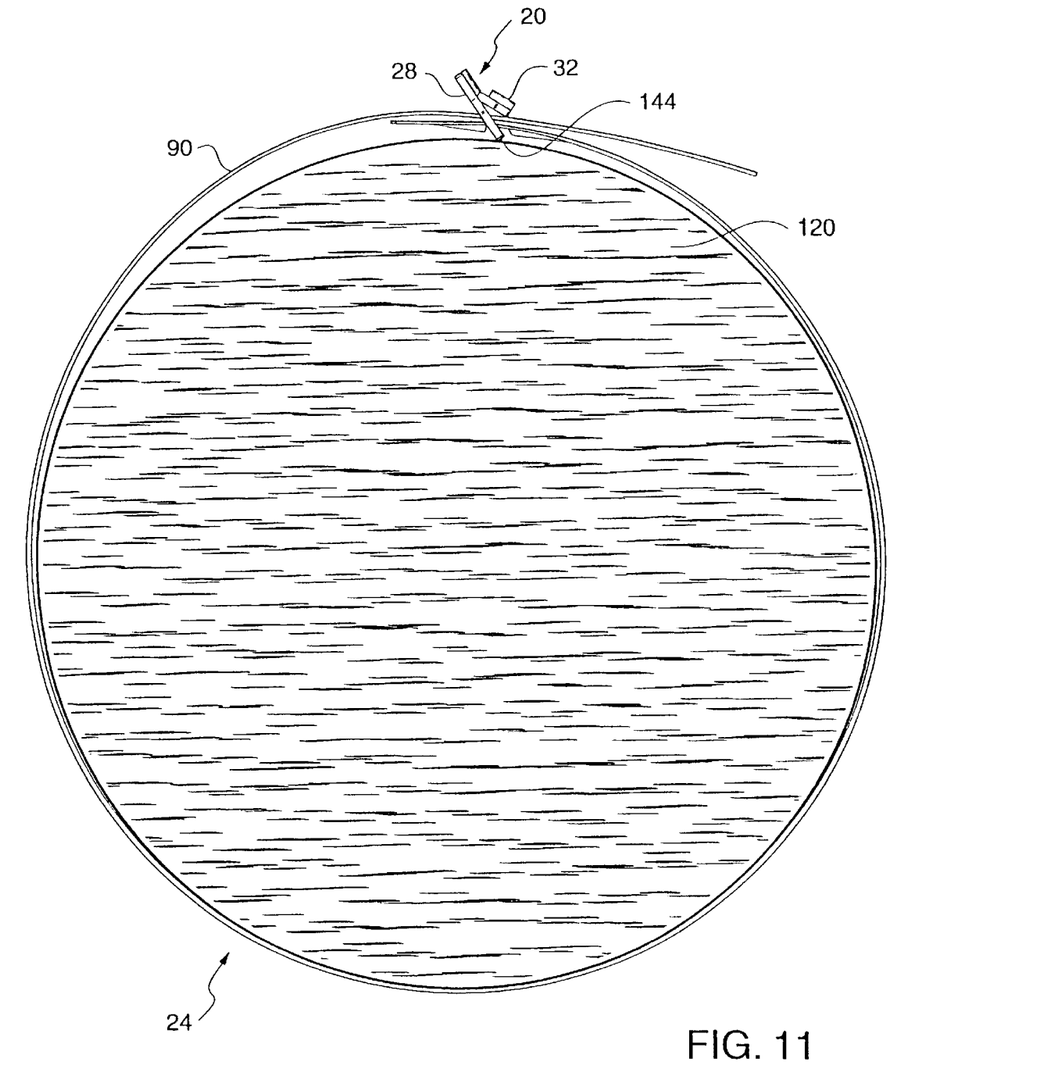
FIG. 11 is a top view of the clamping device being wrapped around a pole.

After positioning the buckle 20 on the band 24, the band 24 is looped around the object 120 and the second end 64 is passed through the slot 36 a second time as shown in FIG. 11. As desired, additional loops of the band 24 around the object (e.g., by passing the second end 64 through the slot 36) may be made to increase the strength of the clamping device when locked in position around the object.

Figure 12:
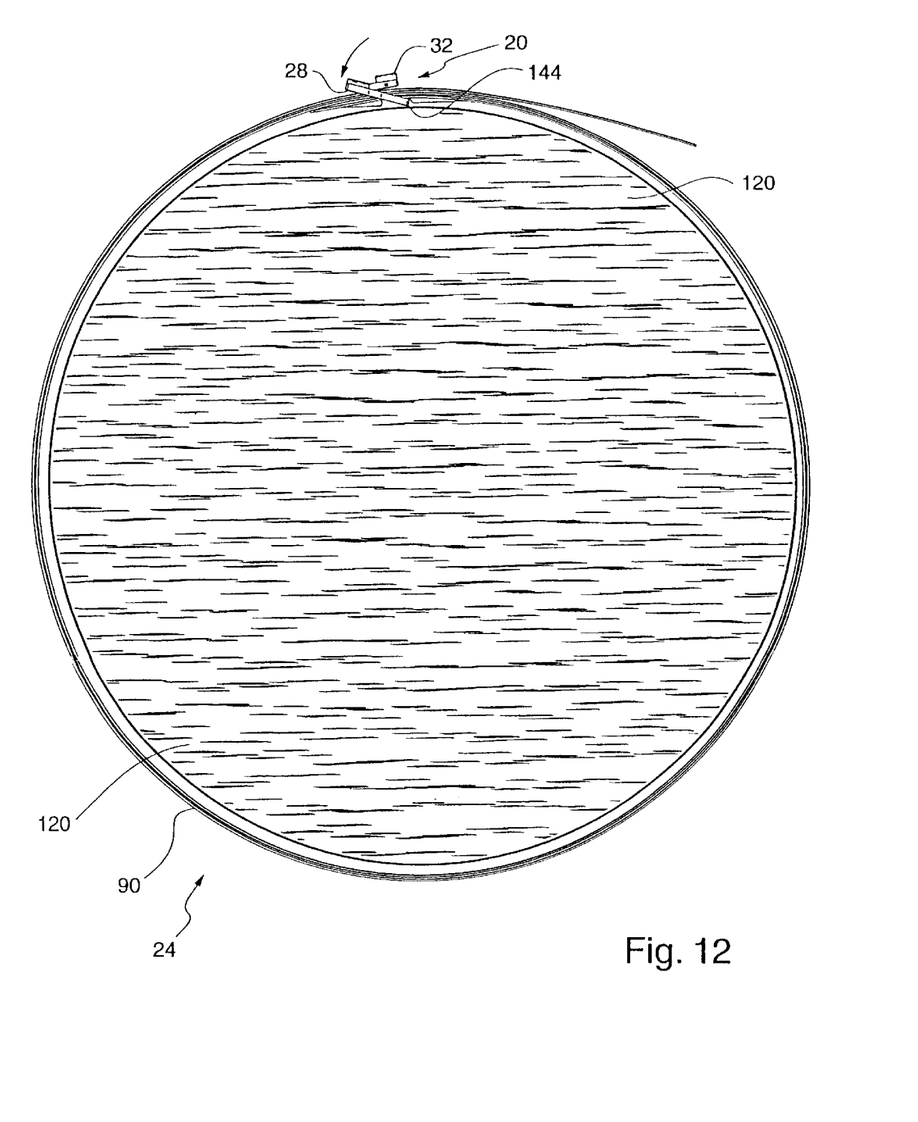
FIG. 12 is a top view of the clamping device being tightened on the pole.
Figure 13:
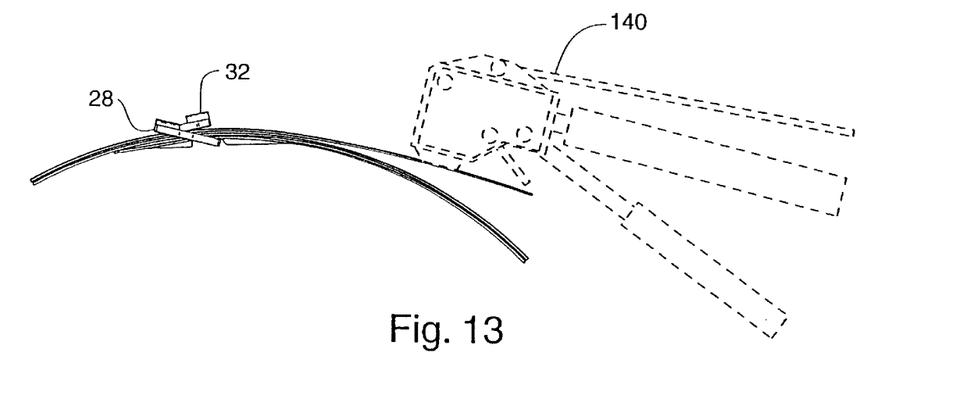
FIG. 13 is a side view of the clamping device being tightened using a tool.

After the band 20 is wrapped around the object 120 the desired number of times, a tool 140 (FIG. 13) is employed to tighten the clamping device about the object 120. The design and operation of the tool is described in FIGS. 12B and 12D of U.S. Pat. Nos. 5,566,726, 5,483,998, and 5,322,091 which are incorporated herein fully by reference in its entireties. As the clamping device is tightened, the base 28 will, as shown in FIGS. 11–12, rotate downwardly about the edge 144 contacting the object 120, thereby forcing the strip 90 into the channel 116 and reducing the clearance of the band in the slot 36.

Figure 14:
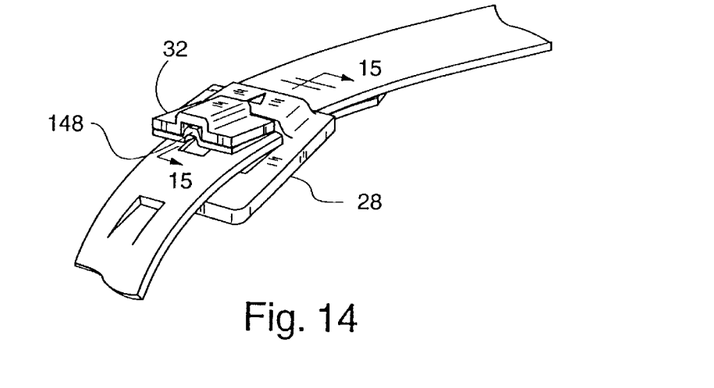
FIG. 14 is a perspective view of the clamping device after the tool has cut and deformed the second end.
Figure 15:
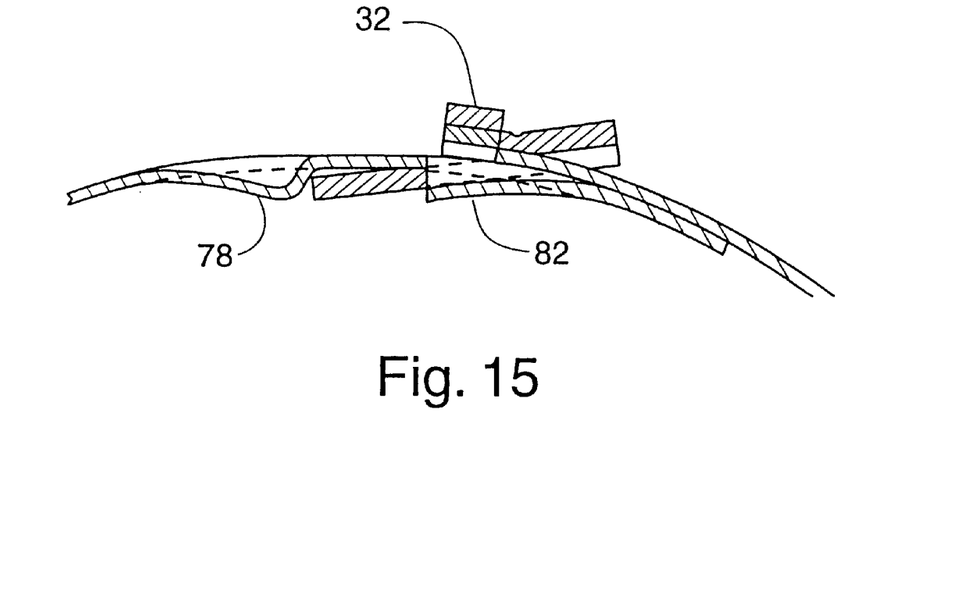
FIG. 15 is a cross sectional view along lines 15—15 in FIG. 14.

When the clamping device has been tightened to the desired degree, the band is cut and deformed by the tool 140 to form the indentation 148 shown in FIGS. 14 and 15. The indentation 148 is unable to pass back through the slot 36. The indentation 148 is received in the inverted U-shaped portion of the shroud and thereby held in position. To lower the profile of the shroud above the surface of the object 120, the user can take a blunt object such as a hammer and strike the shroud 32. The shroud 32 will plastically deform and rotate downwardly as a result of the stress build-up at the crease 56.

Although the present invention has been described with reference to particular embodiments, it should be appreciated that further embodiments can be provided within the spirit and scope of this invention.

What is claimed is:

1. A clamping device for fastening to an object, comprising:
   a band for wrapping around an object;
   a buckle secured to a first end of the band, the buckle including a shroud defining a first plane and a base defining a second plane, the first and second planes intersecting at an angle and the base containing a slot located below the shroud for receiving a second end of the band, wherein at least a portion of the base crosses over a portion of the band located in the slot.

2. A clamping device according to claim 1, wherein the angle is no more than about 35 degrees and the band extends from a first location below the band to a second location above the band.

3. A clamping device according to claim 1, wherein the slot extends through the base for receiving the second end of the band and the shroud is positioned above the slot.

4. A clamping device according to claim 1, wherein the shroud includes a crease extending across at least a portion of the shroud about which the shroud rotates in response to a force applied to the shroud.

5. A clamping device according to claim 1, wherein a rear of the base is elevated above one or more sides and a front of the base for receiving a portion of the band.

6. A clamping device according to claim 1, wherein the band includes a pair of spaced apart retention members for receiving a portion of the base of the buckle therebetween and a longitudinal axis of the slot is substantially orthogonal to the second plane.

7. A clamping device according to claim 6, wherein the retention members are positioned on opposing exterior sides of the slot.

8. A clamping device according to claim 6, wherein the retention members and shroud are located on opposing sides of the first end of the band and the slot is bounded by rear, front and side sections of the base.

9. A clamping device according to claim 6, wherein one of the retention members is sized to pass through the slot and the other of the retention members is too large to pass through the slot.

10. A clamping device according to claim 9, wherein the other of the retention members is located closer to the first end than the one of the retention members.

11. A clamping device according to claim 1, wherein the base has opposing distal and proximal ends, the shroud opening towards the second end of the band and towards the proximal end of the base, and wherein the distal and proximal ends are positioned on opposing sides of the at least a portion of the band.

12. A clamping device according to claim 1, wherein the slot and the shroud open towards the second end.

13. A clamping device according to claim 1, wherein the thickness of the buckle is at least about 250% of the thickness of the band.

14. A method for attaching a clamping device to an object, comprising:

aligning a marker on a buckle with a marker on a band;

passing a free end and at least a portion of the band through a slot in the buckle;

thereafter forming the band into a loop by again passing said free end of the band through the slot in the buckle; and thereafter deforming the band such that the band will not pass back through the slot in the buckle.

15. A method according to claim 14, further comprising:

unrolling a continuous portion of a roll of band material; and separating the continuous portion from the roll.

16. A method according to claim 14, further comprising, directly before the aligning step, separating the band at the intersection between adjacent bands in a continuous length of band material.

17. A method according to claim 16, wherein the continuous length of band material includes a notch and a slot across the band at the intersection between adjacent bands to allow the band to be broken off from the roll at the location of the slot without the help of a cutting tool.

18. A method according to claim 14, wherein the thereafter forming step comprises rotating the buckle about a portion of the band to decrease the clearance of the band in the slot of the buckle.

19. A method for attaching a clamping device to an object, comprising:

passing a free end and at least a portion of a band through a slot in a buckle wherein the slot is formed between a shroud and a base of the buckle, plane of the shroud intersecting a plane of the base at an angle;

forming the band into a loop by again passing said free end of the band through the slot in the buckle;

rotating the buckle downwardly to decrease the clearance of the band in the slot of the buckle; and thereafter deforming a portion of the band such that the deformed portion of the band is larger than the slot in the buckle.

20. A method according to claim 19, further comprising:

aligning a marker on the buckle with a marker on the band.

21. A method according to claim 19, wherein the thereafter deforming step includes cutting the band.

* * * * *